(12) United States Patent
Kajimaru et al.

(10) Patent No.: US 6,818,699 B2
(45) Date of Patent: Nov. 16, 2004

(54) AQUEOUS DISPERSION OF POLYESTER RESIN, PRODUCTION METHOD OF THE SAME, AND AQUEOUS COATING COMPOSITION

(75) Inventors: Hiroshi Kajimaru, Uji (JP); Daisuke Shirasawa, Uji (JP); Toru Tanaka, Uji (JP); Sachiko Kokuryo, Uji (JP)

(73) Assignee: Unitika Ltd., Hyogo (JP)

( * ) Notice: Subject to any disclaimer, the term of this patent is extended or adjusted under 35 U.S.C. 154(b) by 212 days.

(21) Appl. No.: 09/961,412

(22) Filed: Sep. 25, 2001

(65) Prior Publication Data

US 2002/0061959 A1 May 23, 2002

(30) Foreign Application Priority Data

Sep. 28, 2000 (JP) ......................................... 2000-296526
Aug. 20, 2001 (JP) ......................................... 2001-249084

(51) Int. Cl.[7] .......................... C08L 67/02; C08L 67/00; C08G 63/181
(52) U.S. Cl. ........................ 524/845; 524/601; 524/604; 528/308; 528/501
(58) Field of Search ................................ 524/845, 601, 524/604; 528/308, 501

(56) References Cited

U.S. PATENT DOCUMENTS

| 5,356,989 A | * 10/1994 | Tachika et al. |
| 5,449,707 A | 9/1995 | Higashiura et al. |
| 5,484,842 A | 1/1996 | Lewarchik et al. |
| 5,869,567 A | 2/1999 | Fujita et al. |
| 6,180,180 B1 | * 1/2001 | Hintze-Bruning et al. |

FOREIGN PATENT DOCUMENTS

| EP | 0794212 A1 | 9/1997 |
| JP | 60-248735 | 12/1985 |
| JP | 62-21380 | 5/1987 |
| JP | 4-366164 A | 12/1992 |
| JP | 5-295100 A | 11/1993 |
| JP | 9-216921 A | 8/1997 |
| JP | 2000-026709 | 1/2000 |

* cited by examiner

*Primary Examiner*—Tae H. Yoon
(74) *Attorney, Agent, or Firm*—Birch, Stewart, Kolasch & Birch, LLP

(57) ABSTRACT

The present invention is to provide an aqueous dispersion of polyester resin with an excellent molecular weight stability, its production method, and an aqueous coating composition. An aqueous dispersion of polyester resin having an acid value of 8 to 40 mg KOH/g and a weight average molecular weight of 9,000 or more contains an organic solvent less than 0.5% by mass. A method for producing the aqueous dispersion of polyester resin comprising a step of at first obtaining an aqueous dispersion of polyester resin containing not lower than 0.5% by mass of an organic solvent by adding the polyester resin and a basic compound to an aqueous medium to make the resulting mixture aqueous and a step of removing the organic solvent from the aqueous dispersion. An aqueous coating composition can be obtained by adding a curing agent to the foregoing aqueous dispersion of polyester resin.

14 Claims, No Drawings

AQUEOUS DISPERSION OF POLYESTER RESIN, PRODUCTION METHOD OF THE SAME, AND AQUEOUS COATING COMPOSITION

BACKGROUND OF THE INVENTION

1. Field of the Invention

The present invention relates to an aqueous dispersion of polyester resin to be applied to a substrate to form a film with a high water-proofness and high solvent resistances.

2. Description of the Related Art

Polyester resin composed of polybasic acid components and polyhydric alcohol components and having a high molecular weight as resin for forming a coating film is excellent in processibilities of the coating film, resistances (solvent resistances) to organic solvents, weathering resistances, and adhesion properties to a variety of substrates, so that it is immensely used as a binder component in fields of coating materials, inks, adhesives, coating agents, and the like.

Especially, today the use of an organic solvent tends to be restricted from the standpoint of preserving environments, saving resources, restricting hazardous substances by the Fire Services Act or the like, and improving industrial hygiene and it has been thriving in development of an aqueous dispersion of polyester resin, in which polyester resin is finely dispersed in an aqueous medium as the polyester resin type binder to be employed for the above described purposes.

For example, Japanese Patent Laid-Open No. Hei9-296100 proposes an aqueous dispersion of polyester resin obtained by dispersing polyester resin with an acid value of 10 to 40 mgKOH/g and a weight average molecular weight of 9,000 or higher in an aqueous medium, and it is described that a coating film excellent in properties such as processibilities, a water proofness, and solvent resistances can be produced using such an aqueous dispersion.

The above described aqueous dispersion of polyester resin can be used as a coating agent for a variety of substrates and is capable of forming a high quality polyester resin coating film with a high adhesion strength, however if the dispersion is stored for a long duration, the molecular weight of the polyester resin tends to be lowered. Therefore, it is probable to cause a problem of deterioration of the properties such as the processibilities, the water proofness, the solvent resistances and the like of the coating film formed using the foregoing dispersion.

SUMMARY OF THE INVENTION

The present invention is to provide an aqueous dispersion of polyester resin being excellent in a stability on a molecular weight even if it is stored for a long time, its production method, and an aqueous coating composition.

The above object can be achieved by an aqueous dispersion of polyester resin having an acid value of 8 to 40 mg KOH/g and a weight average molecular weight of 9,000 or more, wherein the aqueous dispersion contains an organic solvent less than 0.5% by mass.

The above object can be achieved by a method for producing the aqueous dispersion of polyester resin described above, comprising at first a step of obtaining an aqueous dispersion of polyester resin containing not lower than 0.5% by mass of an organic solvent by adding the polyester resin and a basic compound to an aqueous medium to make the resulting mixture aqueous and then a step of removing the organic solvent from the aqueous dispersion.

The above object can be achieved by an aqueous coating composition being obtained by adding a curing agent to the aqueous dispersion of polyester resin described above.

DESCRIPTION OF THE PREFERRED EMBODIMENTS

Inventors of the present invention have found that an aqueous dispersion of polyester resin with stable molecular weight can be obtained by dispersing polyester resin with the controlled acid value and the controlled weight average molecular weight in an aqueous medium containing an organic solvent and then decreasing the content of the organic solvent by removing the organic solvent from the aqueous dispersion of polyester resin obtained in such a manner and consequently completed the present invention.

Since the aqueous dispersion of polyester resin of the present invention is excellent in a molecular weight stability and keeps the molecular weight scarcely decreased even for a long time storage, even if the aqueous dispersion of the present invention is stored for a long time, a resin film which is excellent in processibilities, a water proofness and solvent resistances can be formed using the aqueous dispersion.

Further, since the organic solvent of the aqueous dispersion of polyester resin of the present invention is efficiently decreased, it is excellent in the standpoint of preserving the environments and improving the industrial hygiene and further, even if the foregoing dispersion is applied to a substance inferior in solvent resistances or to an ink layer inferior in solvent resistances, it does not cause damages on the substrate surface or the bleed or separation of ink.

That is, the present invention relates to an aqueous dispersion of polyester resin comprising polyester resin with an acid value of 8 to 40 mgKOH/g and a weight average molecular weight of 9,000 or more and an organic solvent, wherein the content of the organic solvent is less than 0.5% by mass.

Hereinafter, the present invention will be described more practically.

An aqueous dispersion of polyester resin (hereinafter referred to as an aqueous dispersion) of the present invention is a liquid substance containing polyester resin having an acid value of 8 to 40 mgKOH/g and a weight average molecular weight of 9,000 or more in an aqueous medium.

At first, the polyester resin will be described.

As acid components of the polyester resin, examples are aromatic polybasic acids, aliphatic polybasic acids, and alicyclic polybasic acids. Among the aromatic polybasic acids, examples of aromatic dicarboxylic acids are terephthalic acid, isophthalic acid, orthophthalic acid, naphthalenedicarboxylic acid, biphenyldicarboxylic acid and the like. Among the aliphatic polybasic acids, examples of aliphatic dicarboxylic acids are saturated dicarboxylic acids, such as oxalic acid, succinic acid, succinic anhydride, adipic acid, azelaic acid, sebasic acid, dodecanedioic acid, hydrogenated dimer acids and the like and unsaturated dicarboxylic acids such as fumaric acid, maleic acid, maleic anhydride, itaconic acids, itaconic anhydride, citraconic acid, citraconic anhydride, dimer acids and the like. Among the alicyclic polybasic acids, examples of alicyclic dicarboxylic acids are 1,4-cyclohexanedicarboxylic acid, 1,3-cyclohexanedicarboxylic acid, 1,2-cyclohexanedicarboxylic acid, 2,5-norbornenedicarboxylic acid and its anhydride, and tetrahydrophthalic acid and its anhydride and the like.

Further, based on necessity, a slight amount of sodium 5-sulfoisophthalic acid and 5-hydroxyisophthalic acid may be used as acid components unless they deteriorate a water proofness of a coating film.

Among the foregoing acid components, preferable are aromatic polybasic acids and the ratio of the aromatic polybasic acids in the acid components in the polyester resin is preferably 70% by mole or higher, more preferably 80% by mole or higher. Since the ratio of the aromatic ester bonds in the resin skeleton which are harder to be hydrolyzed than the ester bonds of aliphatic or alicyclic acids is increased more by increasing the ratio of the aromatic polybasic acids, the coating film (hereinafter referred to as a resin coating film) formed using the aqueous dispersion is provided with improved hardness, water-proofness, and solvent resistances and further a storage stability of the aqueous dispersion is improved and they are therefore preferable. Incidentally, the storage stability means that the dispersed resin particles are not precipitated and are possible to be stably and evenly dispersed when the aqueous dispersion is kept in storage for a long duration.

Further, from the viewpoint of improvement of processibilities, a hardness, a water proofness, solvent resistances, weathering resistances while other properties of the resin coating film being well-balanced with these properties, among the aromatic polybasic acids, preferable are terephthalic acid and isophthalic acid and especially preferable is terephthalic acid.

Also as acid components, the following polybasic acids with three or more functional groups may be added; trimellitic acid, pyromellitic acid, benzophenonetetracarboxylic acid, trimellitic anhydride, pyromellitic anhydride, benzophenonetetracarboxylic acid anhydride, trimesic acid, ethylene glycol bis(anhydrotrimellitate), glycerol tris (anhydrotrimellitate), 1,2,3,4-butanetetracarboxylic acid and the like. In this case, from a viewpoint of keeping processibilities of the resin coating film excellent, the ratio of the polybasic acids with three or more functional groups in the acid components in the polyester resin is preferably 10% by mole or lower, more preferably 8% by mole or lower, and especially more preferably 5% by mole or lower.

As alcohol components of polyester resin, examples are aliphatic glycols having preferably 2 to 10 carbon atoms, alicyclic glycols having preferably 6 to 12 carbon atoms, ether bond-containing glycols and the like. Examples of such aliphatic glycols are ethylene glycol, 1,2-propanediol, 1,3-propanediol, 1,4-butanediol, 2-methyl-1,3-propanediol, 1,5-pentanediol, neopentyl glycol, 1,6-hexanediol, 3-methyl-1,5-pentanediol, 1,9-nonanediol, 2-ethyl-2-butylpropanediol, and the like; and an example of the alicyclic glycols are 1,4-cyclohexanedimethanol; and examples of the ether bond-containing glycols are diethylene glycol, triethylene glycol, dipropylene glycol and the like.

Incidentally if the ether structure is increased, it sometimes results in decrease of a water proofness and weathering resistances of the polyester resin. Therefore, it is preferable to keep the use amount of the ether bond-containing glycol within the range in which the water proofness and the weathering resistances are not deteriorated.

Further, also usable as the alcohol components are glycols [for example, 2,2-bis(4-hydroxyethoxyphenyl)propane] obtained by adding one to several moles of ethylene oxide or propylene oxide separately to two phenolic hydroxyl groups of bisphenols, poly(ethylene glycol), poly(propylene glycol), poly(tetramethylene glycol) and the like.

Among the foregoing alcohol components, especially preferable are the following three components; 1,2-propanediol, neopentyl glycol, and ethylene glycol. It is preferable to mainly use 1,2-propanediol together with ethylene glycol or neopentyl glycol together with ethylene glycol. Further, these three compounds may also preferably be used. Since ethylene glycol, neopentyl glycol, and 1,2-propanediol are produced by mass production, they are economical and are capable of well-balancing many properties of the resin coating film, ethylene glycol is especially capable of improving chemical resistances of the resin coating film and neopentyl glycol and 1,2-propanediol are especially capable of improving weathering resistances of the resin coating film.

The ratio of the total amount of 1,2-propanediol, neopentyl glycol, and ethylene glycol in the alcohol components of the polyester resin is preferably 50% by mole or more, more preferably 60% by mole or more, and especially preferably 70% by mole or more. In this case, it is preferable to contain ethylene glycol at a ratio of 10 to 65% by mole in the total of foregoing three alcohol components.

Further, as the alcohol components, polyhydric alcohols with three or more functional groups, for example, glycerin, trimethylolethane, trimethylolpropane, pentaerythritol and the like may be contained. In this case, from a viewpoint of keeping excellent processibilities of the resin coating film, the ratio of the polyhydric alcohols with three or more functional groups contained in the alcohol components in the polyester resin is preferably 10% by mole or lower, more preferably 8% by mole or lower, and especially more preferably 5% by mole or lower.

Practical monomer constitutions of the polyester resin are those of the follow copolymers. That is, terephthalic acid (TPA)/ethylene glycol (EG)/neopentyl glycol (NPG), TPA/isophthalic acid (IPA)/EG/NPG, TPA/adipic acid (ADA)/EG/NPG, TPA/IPA/ADA/EG/NPG, TPA/sebasic acid (SEA)/EG/NPG, TPA/IPA/SEA/EG/NPG, TPA/EG/1,2-propanediol (PG), TPA/IPA/EG/PG, TPA/EG/NPG/PG, TPA/IPA/EG/NPG/PG, TPA/ADA/EG/PG, TPA/IPA/ADA/EG/PG, TPA/ADA/EG/NPG/PG, TPA/IPA/ADA/EG/NPG/PG, TPA/SEA/EG/PG, TPA/IPA/SEA/EG/PG, TPA/SEA/EG/NPG/PG, TPA/IPA/SEA/EG/NPG/PG, TPA/EG/PG/2,2-bis(4-hydroxyethoxyphenyl)propane (BAEO), TPA/IPA/EG/PG/BAEO, TPA/EG/NPG/PG/BAEO, TPA/IPA/EG/NPG/PG/BAEO, TPA/ADA/EG/PG/BAEO, TPA/IPA/ADA/EG/PG/BAEO, TPA/ADA/EG/NPG/PG/BAEO, TPA/IPA/ADA/EG/NPG/PG/BAEO, TPA/SEA/EG/PG/BAEO, TPA/IPA/SEA/EG/PG/BAEO, TPA/SEA/EG/NPG/PG/BAEO, TPA/IPA/SEA/EG/NPG/PG/BAEO, TPA/EG/BAEO, TPA/IPA/EG/BAEO, TPA/EG/NPG/BAEO, TPA/IPA/EG/NPG/BAEO, TPA/ADA/EG/BAEO, TPA/IPA/ADA/EG/BAEO, TPA/ADA/EG/NPG/BAEO, TPA/IPA/ADA/EG/NPG/BAEO, TPA/SEA/EG/BAEO, TPA/IPA/SEA/EG/BAEO, TPA/SEA/EG/NPG/BAEO, TPA/IPA/SEA/EG/NPG/BAEO, and the like. Above all, the following copolymers; TPA/IPA/EG/NPG, TPA/IPA/EG/NPG, TPA/EG/PG, TPA/IPA/EG/NPG/BAEO, and TPA/IPA/ADA/EG/NPG; are well-balanced between chemical resistances and processibilities if being formed in a coating film, so that they are especially preferable.

Further, based on the necessity, the polyester resin may be copolymerized with aliphatic acids such as lauric acid, myristic acid, palmitic acid, stearic acid, oleic acid, linoleic acid, linolenic acid and their ester-formable derivatives; monocarboxylic acids with high boiling point such as benzoic acid, p-tert-butylbenzoic acid, cyclohexanoic acid, 4-hydroxyphenylstearic acid and the like; monoalcohols with high boiling point such as stearyl alcohol, 2-phenoxyethanol and the like; hydroxycarboxylic acids such as ε-caprolactone, lactic acid, β-hydroxybutyric acid, p-hydroxybenzoic acid and their ester-formable derivatives.

The acid value of the polyester resin is required to be 8 to 40 mg KOH/g and preferably 8 to 30 mg KOH/g, and especially preferably 8 to 25 mg KOH/g. If the acid value is higher than 40 mg KOH/g, a water proofness and solvent resistances of the resin coating film tend to be insufficient. On the other hand, if the acid value is lower than 8 mg KOH/g, the polyester resin becomes difficult to be dispersed in an aqueous medium and an even aqueous dispersion is made difficult to obtain and consequently, the aqueous dispersion tends to be deteriorated in a storage stability.

Further, the weight average molecular weight of the polyester resin is required to be 9,000 or more, preferably 14,000 or more, and especially preferably 16,000 or more. If the weight average molecular weight is less than 9,000, a water proofness and solvent resistances of the resin coating film become insufficient and processibilities of the resin coating film tend to become insufficient.

Incidentally, from a viewpoint of easiness to provide the polyester resin with a sufficient acid value, the weight average molecular weight is preferably 45,000 or lower, more preferably 40,000 or lower, and especially more preferably 35,000 or lower.

Further, the polyester resin may contain hydroxyl groups and taking a water proofness into consideration, the hydroxyl value is preferably 30 mg KOH/g or lower and more preferably 20 mg KOH/g or lower.

Further, the glass transition temperature (abbreviated as $T_g$) of the polyester resin is not particularly restricted, however, from a viewpoint of easiness to keep balance between a hardness and processibilities of the resin coating film, it is preferably 0° C. to 100° C., more preferably 40° C. to 100° C., further more preferably 60° C. to 100° C., and especially preferably 80° C. to 100° C.

Further, the shape of the polyester resin particles dispersed in the aqueous dispersion of the present invention is not particularly restricted, however, from a viewpoint of improvement of a storage stability of the aqueous dispersion, the shape is preferable to be approximately spherical and the average value D(ave) of the ratio D (the value calculated by dividing the minor axis with the major axis) of the minor axis to the major axis of any optional 50 in number of polyester resin particles is preferably 0.8 or higher, more preferably 0.9 or higher, and further more preferably 0.95 or higher.

Further, the average particle size and the particle size distribution of the polyester resin particles dispersed in the aqueous dispersion of the present invention are also not particularly restricted, however, from a viewpoint of improvement of a storage stability of the aqueous dispersion, the average particle size is preferably 10 μm or smaller, more preferably 5 μm or smaller, and further more preferably 1 μm or smaller, and especially preferably 0.5 μm or smaller.

The polyester resin can be produced from the above described acid components and alcohol components by a well-known polymerization method.

Preferable methods for the production method are as follows:

(a) a method for obtaining polyester resin by carrying out esterification reaction of all of the monomer components and/or their lower polymers at 180° C. to 250° C. under an inert gas atmosphere for about 2.5 to 10 hours and successively carrying out polycondensation in the presence of an interesterification catalyst at 220° C. to 280° C. under pressure decreased to 1 Torr or lower until the molecular weight reaches an aimed value;

(b) a method comprising a step of finishing the foregoing polycondensation reaction before the molecular weight reaches the aimed value and a step of increasing the molecular weight by mixing the reaction products with a chain extending agent selected from epoxy-type compounds, isocyanate-type compounds, and bisoxazoline-type compounds in the next step and carrying out a reaction for a short time; and (c) a method for obtaining the polyester resin with the aimed molecular weight by promoting the foregoing polycondensation reaction until the molecular weight reaches the aimed value or higher, further adding monomer components, and carrying out depolymerization under an inert gas atmosphere of normal or increased pressure.

In the present invention, from a viewpoint of an easiness for controlling an acid value and a weight average molecular weight, the method (c) is especially preferable. In this case, as the monomer components to be added for the depolymerization, preferable to be used are terephthalic acid, isophthalic acid, trimellitic anhydride, trimellitic acid, pyromellitic acid and the like. Further, in this case, in order to control a hydroxyl value at the same time, alcohol components may be added and preferable to be used are ethylene glycol, neopentyl glycol, trimethylolpropane, pentaerythritol, glycerin and the like.

Incidentally, the carboxyl group contributing to an aqueous property of the polyester resin is more preferable to exist unevenly in the terminals of the resin molecular chains than to exist in the resin skeleton from the viewpoint of improvement of a hot-water proofness. As the method for obtaining such a polyester resin without being accompanied with side reactions or gelling phenomenon, examples are a method including a step of adding polybasic acids with three or more functional groups or their ester-formable derivatives after the start of the polycondensation reaction or adding acid anhydrides of polybasic acids immediately before completion of the polycondensation reaction in the above described method (a); a method including a step increasing the molecular weight of lower molecular weight polyester resin whose molecular terminals are almost all carboxyl groups by using a chain extending agent in the above described method (b); and a method including a step of using polybasic acids or their ester-formable derivatives as a depolymerization agent in the above described method (c).

The aqueous dispersion of the present invention contains the foregoing polyester resin dispersed or dissolved in an aqueous medium. In this case, the aqueous medium is a medium of a liquid mainly containing water and an organic solvent and may contain a basic compound to be mentioned later.

The content of the polyester resin in the aqueous dispersion of the present invention may properly be selected depending on the film formation conditions, the thickness and the properties of the aimed resin coating film and is not particularly restricted. However, in order to properly keep the viscosity of a coating composition and attain an excellent film formability, the content is preferably 1 to 60% by mass, more preferably 3 to 55% by mass, further more preferably 5 to 50% by mass, and especially preferably 10 to 45% by mass.

In the aqueous dispersion of the present invention, the carboxyl groups of the polyester resin are preferably neutralized by a basic compound, so that the agglomeration of the fine particles can be prevented owing to the electric repulsing force among the produced carboxyl anions and the aqueous dispersion is provided with a stability.

The basic compounds to be employed for such a purpose are preferably organic amines with a boiling point of 250° C. or lower, preferably 160° C. or lower or ammonia since they are easy to be evaporated at the time of film formation. Practical examples of the organic amines to be preferably used are triethylamine, N,N-diethylethanolamine, N,N-dimethylethanolamine, aminoethanolamine, N-methyl-N,N-diethanolamine, isopropylamine, iminobis(propylamine), ethylamine, diethylamine, 3-ethoxypropylamine, 3-diethylaminopropylamine, sec-butylamine, propylamine, methylaminopropylamine, dimethylaminopropylamine, methyliminobis(propylamine), 3-methoxypropylamine, monoethanolamine, diethanolamine, triethanolamine, morpholine, N-methylmorpholine, N-ethylmorpholine and the like. Among them, triethylamine is most preferable.

The use amount of the foregoing basic compounds is adjusted depending on the amount of the carboxyl groups contained in the polyester resin to neutralize at least partially them and that is, it is preferably 0.2 to 2 times as much as the equivalent amount of the carboxyl group and more preferably 0.4 to 1.5 times. If the use amount of the basic compounds is at least 0.2 time as much as the equivalent amount, a storage stability can be sufficiently provided. If it is at highest 2 times as much as the equivalent amount, the viscosity of the aqueous dispersion is not so much increased and therefore it is preferable.

Further, in the present invention, the content of the organic solvent contained in the aqueous dispersion is lower than 0.5% by mass. If the content of the organic solvent is 0.5% by mass or higher, in the case the aqueous dispersion is stored for a long duration, the molecular weight of the polyester resin is considerably decreased. Therefore, the resin coating film formed using the aqueous dispersion stored for a long duration is probably deteriorated in processibilities, a water proofness, and solvent resistances. If the content of the organic solvent is 0.5% by mass or higher, in the case the aqueous dispersion is applied to a substrate with inferior solvent resistances or an ink layer with inferior solvent resistances, problems of damages of the substrate surface and ink bleeding or ink peeling probably take place.

Taking the molecular weight stability (retention of the molecular weight) in the long time storage into consideration, the content of the organic solvent is preferably 0.3% by mass or lower and more preferably 0.1% by mass or lower. Further, as described later, the organic solvent can be removed from the aqueous dispersion which contains 0.5% by mass or more of the organic solvent to obtain the aqueous dispersion of the present invention, however, in order to decrease the organic solvent content to the value being less than the detection limit (0.01% by mass in the measurement method employed for the present invention) of an analyzer by removal, it is required to heighten a reduced pressure degree of an apparatus for distillation removal of the solvent and to prolong an operation duration and therefore, taking productivities into consideration, the content of the organic solvent is preferable to be 0.01% by mass or more.

As the organic solvent, those which have 5 g/L or higher of a solubility in water at 20° C. are preferable and have 10 g/L or higher are more preferable to be used.

Incidentally, the boiling point of the organic solvent is preferably 250° C. or lower and more preferably 150° C. or lower. If it is higher than 250° C., it becomes difficult to evaporate the solvent from the resin coating film by drying.

Examples of the organic solvent to be used in the present invention are alcohols such as ethanol, n-propanol, isopropanol, n-butanol, isobutanol, sec-butanol, tert-butanol, n-amylalcohol, isoamylalcohol, sec-aminoalcohol, tert-amylalcohol, 1-ethyl-1-propanol, 2-methyl-1-butanol, n-hexanol, cyclohexanol and the like; ketones such as methyl ethyl ketone, methyl isobutyl ketone, ethyl butyl ketone, cyclohexanone, isophorone and the like; ethers such as tetrahydrofuran, dioxane and the like; esters such as ethyl acetate, n-propyl acetate, isopropyl acetate, n-butyl acetate, isobutyl acetate, sec-butyl acetate, 3-methoxybutyl acetate, methyl propionate, ethyl propionate, diethyl carbonate, dimethyl carbonate and the like; glycol derivatives such as ethylene glycol, ethylene glycol monomethyl ether, ethylene glycol monoethyl ether, ethylene glycol monopropyl ether, ethylene glycol monobutyl ether, ethylene glycol ethyl ether acetate, diethylene glycol, diethylene glycol monomethyl ether, diethylene glycol monoethyl ether, diethylene glycol monobutyl ether, diethylene glycol ethyl ether acetate, propylene glycol, propylene glycol monomethyl ether, propylene glycol monobutyl ether, propylene glycol methyl ether acetate and the like; and further 3-methoxy-3-methylbutanol, 3-methoxybutanol, acetonitrile, dimethylformamide, dimethylacetamide, diacetone alcohol, ethyl acetoacetate and the like and they may be used in combination of two or more of them.

Among the above described organic solvents, from the viewpoint of easiness to remove the organic solvent from the aqueous medium, preferable ones are ethanol, n-propanol, isopropanol, n-butanol, methyl ethyl ketone, tetrahydrofuran, and ethylene glycol monobutyl ether.

Further, based on necessity, the aqueous dispersion of the present invention may contain a compound having protective colloidal function. The term, the protective colloidal function, means the function of performing the stabilizing effect so-called "the mixing effect", "the osmotic pressure effect", or "the volume restriction effect", by adsorption on the surface of the rein fine particles in the aqueous medium to prevent adsorption among the resin fine particles. The compound having such a protective colloidal function includes poly(vinyl alcohol), carboxymethyl cellulose, hydroxyethyl cellulose, hydroxypropyl cellulose, modified starch, poly(vinyl pyrrolidone), polyacrylic acid, polymers of vinyl monomer containing acrylic acid and/or methacrylic acid as a component, polyitaconic acid, gelatin, acacia, casein, swelling mica and the like.

Further, the aqueous dispersion of the present invention may also contain a variety of chemical agents such as a leveling agent, a defoaming agent, a bubbling preventing agent, a pigment dispersing agent, an UV absorbing agent and the like; an aqueous resin composition such as aqueous urethane resin, aqueous acrylic resin and the like; and pigments or dyes such as titanium oxide, zinc flower, carbon black and the like.

In the present invention, the method for producing the aqueous dispersion is not particularly restricted and, for example, the aqueous dispersion of the present invention can be obtained through two steps: a step of producing an aqueous dispersion A with the organic solvent content of 0.5% by mass or higher at first by collectively adding polyester resin and a basic compound to an aqueous medium (the content of an organic solvent is 0.5% by mass or higher) to make them aqueous and a step of removing the organic solvent from the aqueous dispersion A.

Hereinafter, a preferable method comprising the above described two steps will be described in details.

At first, the method for producing the aqueous dispersion A will be described.

An apparatus made ready to be employed is provided with a tank to which a liquid is to be loaded and is capable of properly stirring a mixture of the loaded aqueous medium together with a resin powder or granular substance. As such an apparatus, those widely known as a solid/liquid stirring apparatus and an emulsifier to people in this field can be employed and generally, they are equipped with an easy cover part and usable at a normal pressure or a slight pressurized pressure and if necessary, those to which pressure of 0.1 MPa or higher can be applied are also usable.

The tank of the apparatus is loaded with the aqueous dispersion containing water, a basic compound, and an organic solvent as well as granular or powder state polyester resin and they are roughly dispersed by stirring and mixing at preferably 40° C. or lower. In this case, if the shape of the polyester resin is like a sheet or a large agglomerate which is difficult to be roughly dispersed, the step may be shifted to the following heating step.

Next, while the temperature of the tank being kept to a temperature of not less than $T_g$ of the polyester resin or not less than 45° C., the polyester resin is sufficiently made aqueous by continuously stirring them preferably for 15 to 120 minutes and after that, the mixture is cooled to 40° C. or lower while being preferably stirred to obtain the aqueous dispersion A. The heating method for the inside of the tank is preferably a method for externally heating the inside of the tank, for example, using an oil bath or a water bath or a method for carrying out external heating by passing heated oil or water through a jacket attached to the tank itself.

The method for cooling the inside of the tank is, for example, a method for spontaneously cooling at a room temperature or a cooling method using an oil or water at 0° C. to 40° C. in the above described heating method.

Incidentally, after that, if necessary, jet pulverization treatment may further be carried out. In this case, the term, jet pulverization treatment means that a fluid of such as an aqueous dispersion of polyester resin is jetted out of a fine pore like a nozzle or a slit under a high pressure to making the resin particles come into collision against one another or the resin particles against a collision plate to further finely granulate the resin particles by the mechanical energy. As practical examples of the apparatus are a homogenizer manufactured by A.P.V. GAULIN Co., Microfluidizer M-110E/H manufactured by Mizuho Industrial Co., Ltd. and the like.

Next, the aqueous dispersion of the present invention can be obtained by removing the organic solvent from the aqueous dispersion A obtained in such a manner.

As the organic solvent removal method, a method for distillation removal of the organic solvent by heating the aqueous dispersion A at a normal pressure or a decreased pressure while stirring the dispersion. The content of the organic solvent can quantitatively measured by gas chromatography and if the content is 0.5% by mass or more, the distillation removal of the organic solvent may be repeated in the same manner as described above. Further, owing to the distillation removal of the aqueous medium, the solid matter concentration is increased and if, for example, the viscosity is increased and the workability is deteriorated, water may previously be added to the aqueous dispersion A.

As the method for adjusting the solid matter concentration of the aqueous dispersion obtained in such a manner is preferable to comprise a step of dilution with water after distillation removal of the aqueous medium to the desired solid matter concentration or further.

As described above, the aqueous dispersion of the present invention is obtained by dispersing or dissolving the polyester resin in an aqueous medium and making the resulting mixture be an even liquid-state. In this case, the term, the even liquid-state, means the state that no part is observed on an outward appearance of the aqueous dispersion where the solid matter concentration is locally different from others owing to, for example, precipitate, phase separation, film formation in the surface.

Further it is preferable for the aqueous dispersion to contain no coarse particle immediately after production. In this case, the term, the coarse particle, practically means the particles remaining on a filter when the aqueous dispersion is filtered by pressure (air pressure of 0.2 MPa) with a 300-mesh filter made of a stainless steel (the wire diameter of 0.035 mm and plain stitch) and the foregoing filtration may be carried out during the production for the purpose to prevent contamination of the aqueous dispersion with the coarse particles.

The aqueous dispersion of the present invention produced in such a manner has a characteristic of slight viscosity fluctuation attributed to the ambient temperature change and has an advantage of workability to easily control a thickness at the time of film formation. Practically, the ratio of the viscosity at 40° C. to that at 10° C. is within 0.3 to 1.0.

Next, the use method of the aqueous dispersion of the present invention will be described below.

Since the aqueous dispersion of the present invention is excellent in film formabilities, a uniform resin coating film can be formed while being closely stuck to the surface of a variety of substrates by a well-known film formation method comprising a step of applying the aqueous dispersion by such as a dipping method, a brush-coating method, a spray coating method, a curtain flow coating method, and the like, setting the resulting substrate near a room temperature based on necessity, and subjecting the substrate to heating for drying or baking simultaneously with drying. Usable as a heating apparatus is a common hot air circulation type oven, an infrared heater or the like. The heating temperature and the heating duration are properly selected depending on the characteristics of the substrate, which is an object to be coated, and the type and the addition amount of a curing agent which will be described later. However from the viewpoint of economical properties, the heating temperature is preferably 30° C. to 250° C., more preferably 60° C. to 200° C., and further more preferably 90° C. to 160° C. and the heating time is preferably 1 second to 20 minutes, more preferably 5 seconds to 10 minutes, and further more preferably 10 seconds to 5 minutes.

Incidentally, if the above described precipitated or deposited matter is observed in the aqueous dispersion before the use, it is preferable to remove the matter to use the aqueous dispersion free from it.

Further, the thickness of the resin coating film to be formed using the aqueous dispersion of the present invention is properly selected depending on the use, however it is preferably 0.01 to 100 μm, more preferably 0.1 to 50 μm, and further more preferably 0.5 to 25 μm. By forming a film while controlling the thickness of the resin coating film within the above described range, a resin coating film excellent in an evenness can be obtained.

Incidentally, in order to adjust the thickness of the resin coating film, in addition to proper selection of the apparatus and the use conditions to be employed for the coating, it is preferable to use the aqueous dispersion whose concentration is controlled to the value being proper to form the resin coating film with the aimed thickness. Such a concentration can be adjusted depending on the loaded composition at the time of production. Moreover, the adjustment may be carried out by properly diluting the once-produced aqueous dispersion.

While the aqueous dispersion of the present invention may be used as it is, it may be mixed further with a curing agent and the obtained aqueous coating composition is baked and hardened to provide the advanced coating properties, that is further excellent processibilities, waterproofness, and solvent resistances. The curing agent is not particularly restricted if the curing agent has reactivity on the functional groups which the polyester resin has, for example, carboxyl groups and hydroxyl groups, especially on carboxyl groups. Examples are amino resins such as urea resin, melamine resin, benzoguanamine resin and the like, polyfunctional epoxy compounds, polyfunctional isocyanate compounds and a variety of their block isocyanate compounds, polyfunctional aziridine compounds, carbodiimide group-containing compounds, oxazoline group-containing polymers and phenol resin. They may be used solely or in combination of two or more of them. Among the foregoing curing agents, the amino resins, especially melamine resin, polyfunctional epoxy resin, polyfunctional isocyanate compounds and variety of their block isocyanate compounds, oxazoline group-containing polymers, and carbodiimide group-containing compounds are excellent in the reactivity on the polyester resin and therefore they are preferable. Above all, a resin coating film with especially excellent solvent resistances can be obtained using the melamine resin.

The melamine resin is a general term of addition-condensate products of melamine and formaldehyde and they are further converted by addition-condensation reaction with alcohol (ROH) to any one of the following structures of; (1) having amino group (—$NH_2$) remaining as it is; (2) iminomethylol group (—$NHCH_2OH$); (3) iminoalkyl ether group (—$NHCH_2OR$); (4) dimethylolamino group {—N($CH_2OH$)$_2$}; (5) partially alkyletherified dimethylolamino group {—N($CH_2OH$)$CH_2OR$}; and (6) fully alkyletherified dimethylolamino group {—N($CH_2OR$)$_2$}; and these structures (1) to (6) are further condensation-reacted to have polymerized and complicated structures.

The average polymerization degree of the melamine resin is preferably 5 or lower, more preferably 1 to 3.5, and further more preferably 1.1 to 3.

Available as such melamine resin are, for example, Cymel series; Cymel 325, Cymel 303, Cymel 370 and the like and Mycoat series; Mycoat 212 and the like produced by Mitsui-Cytec Co. Ltd.

Based on necessity, the aqueous coating composition of the present invention obtained by adding melamine resin may further contain p-toluenesulfonic acid, dodecylbenzenesulfonic acid or the like blocked by an organic amine compound as an acidic catalyst.

As the polyfunctional epoxy compounds, generally known are glycidyl ether types, glycidyl ester types, glycidyl amine types and the like. The polyfunctional epoxy compounds of the present invention are not restricted to the above described types and those having two or more epoxy groups in each molecule are usable and those having three or more epoxy groups in a molecule are more preferable since they can improve a water proofness, solvent resistances, and the processibilities.

Among the polyfunctional epoxy compounds, preferable are those having an aromatic ring such as a benzene ring, a naphthalene ring and the like in the molecular structure, a cyclic aliphatic ring such as cyclohexane ring, a hetero-ring such as a triazine ring and the like and especially those having an aromatic ring are more preferable since they can improve heat resistances and processibilities. As the polyfunctional epoxy compounds having an aromatic ring, examples are polymers generally known as epoxy resin of such as bisphenol A type, bisphenol F type, bisphenol AD type, bisphenol S type, tetrabromobisphenol A type, cresol novolak type, and phenol novolak type.

The polyfunctional epoxy compounds, especially aromatic ring-containing polyfunctional epoxy compounds, are preferable to have a softening point of 40° C. to 120° C., more preferable to have 50° C. to 110° C., and further more preferable to have 60° C. to 100° C. measured by a ring and ball method standardized in JIS K-7234 from a viewpoint of their capability of keeping the balance between heat resistances and processibilities.

Available as such polyfunctional epoxy compounds are, for example, Denacol EM-150, Denacast EM-101, Denacast EM-103, and the like produced by Nagase Chemicals Ltd.

The aqueous coating composition of the present invention obtained by adding the polyfunctional epoxy compounds may further contain a curing catalyst based on necessity. Examples of the curing catalyst are a primary amine, a secondary amine, a tertiary amine and their polyamines and imidazoles and more practically, they are triethylenediamine as the tertiary amine and 2-methylimidazole as the imidazoles. They are especially effective to promote reaction of the carboxyl groups of the polyester resin and their anhydrides with the polyfunctional epoxy compounds and preferable to be used.

The polyfunctional isocyanate compounds are those having two or more isocyanate groups in each molecule and are preferable to have three or more isocyanate groups since they can improve a water proofness, solvent resistances, and processibilities.

As block isocyanate compounds, examples are those which are obtained by stabilizing some or all of isocyanate groups of the above described polyfunctional isocyanates with a well-known blocking agent such as caprolactam, phenols, oximes, and organic amines.

As the polyfunctional isocyanate compounds, available are Bayhydur 3100, Desmodur N3400, Desmodur DN and the like produced by Sumitomo Bayer Urethane Co., Ltd.; Takenate WD-720, Takenate WD-725, Takenate WD-730, and the like produced by Mitsui-Takeda Chemical Industries, Ltd.; and Durante WB40-100, Duranate WB40-80D, Duranate WX-1741 and the like produced by Asahi Chemical Industry Co., Ltd.

As the block isocyanates available are Bayhydur BL5140, Bayhydur BL5235 and the like produced by Sumitomo Bayer Urethane Co., Ltd.; Elastron BN-69, Elastron BN-69, Elastron BN-77, Elastron BN-27, Elastron BN-04 and the like produced by Dai-Ichi Kogyo Seiyaku Co., Ltd.; Takenate WB-700, Takenate WB-720, Takenate WB-730, Takenate WB-920, Takenate XWB-72-K55 and the like produced by Mitsui-Takeda Chemical Industries, Ltd.

The aqueous coating composition of the present invention obtained by adding the polyfunctional isocyanate compounds and a variety of block isocyanate compounds may contain a curing catalyst based on necessity and as the curing catalyst, examples are tin-containing curing catalysts such as di-n-butyltin dilaurate, tetra-n-butyl tin, tetramethylbutane diamine, and the like.

The oxazoline group-containing polymers are polymers containing one or more oxazoline groups in each molecule and generally, the oxazoline group-containing polymers can easily be obtained by polymerizing an oxazoline derivative-containing monomer compositions as described in, for example, in Japanese Patent Laid-Open No. Hei9-328656. As such an oxazoline derivative, examples are 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-methyl-2-oxazoline, 2-isopropenyl-5-ethyl-2-oxazoline and the like. Further, the monomers added to the oxazoline derivative-containing monomer composition other than the oxazoline derivatives are not particularly restricted if they are copolymerizable with the oxazoline derivatives and inactive to the oxazoline groups. In the oxazoline group-containing polymer, the ratio of the structure derived from the oxazoline derivatives is preferably 5% by mass or higher.

As the oxazoline group-containing polymer, available are, for example, Epocros WS-500, Epocros WS-700, Epocros K1010E, Epocros K1020E, Epocros K1030E, Epocros K2010E, Epocros K2020E, Epocros K2030E and the like produced by NIPPON SHOKUBAI Co., Ltd.

The carbodiimide-group containing compounds mean compounds containing one or more carbodiimide groups (—N=C=N—) in each molecule and commercialized as polymers having generally two or more carbodiimide groups. Available are, for example, Carbodilite E-01, Carbodilite E-02, Carbodilite V-02, Carbodilite V-02-L2, Carbodilite V-04, and Carbodilite V-06 and the like produced by Nisshinbo Industries Inc.

The addition amount of the curing agent is not particularly restricted if the curing of the polyester resin can be performed and it is preferable to be within a range in which adhesion properties to a variety of substrates and processibilities of the polyester resin are not deteriorated. From such a viewpoint, the mass ratio (the non-volatile component ratio) of the polyester resin and the curing agent in the aqueous coating composition is preferably to be polyester resin: the curing agent=(99:1) to (60:40), more preferably polyester resin:the curing agent=(97:3) to (70:30), and further more preferably polyester resin: the curing agent=(95:5) to (75:25). If two or more curing agents are added, the addition amount in the total may be within the above described range.

Further, regarding a curing temperature and a curing duration, since they depend on the type of the curing agent and the thickness of the resin coating film to be formed and the like, they cannot definitely be defined. However, the curing temperature is generally 80° C. to 250° C. and the curing duration is 10 seconds to 30 minutes.

EXAMPLES

The present invention will more particularly be described below along with examples, however the present invention is not at all restricted to these examples.

Incidentally, a variety of the characteristic properties are measured or evaluated by the following methods.

(1) Constitution of Polyester Resin

The constitution was obtained by $^1$H-NMR analysis (Varian Associates, Inc., 300 MHz). Regarding resin containing constituent monomers having no peak which is belonging to the $^1$H-NMR spectrum and is possible to be quantitatively analyzed, its quantitative analysis was carried out by subjecting the resin to methanol decomposition at 230° C. for 3 hours in a sealed pipe and then gas chromatogram analysis.

(2) Acid Value of Polyester Resin

The acid value was measured by at first dissolving 0.5 g of the polyester resin in 50 ml of water/dioxane=10/1 (volume ratio), titrating the resulting solution with KOH using Cresol Red as an indicator, and calculating the amount of KOH by mg consumed for neutralization in titration for 1 g of the polyester resin.

(3) Hydroxyl Value of Polyester Resin

At first, 3 g of polyester resin was precisely measured, mixed with 0.6 ml of acetic anhydride and 50 ml of pyridine, stirred at a room temperature for 48 hours to make them react, and successively mixed with 5 ml of distilled water and further continuously stirred at a room temperature for 6 hours to completely convert the portion of the acetic anhydride which was not consumed for the above described reaction. To the resulting solution, 50 ml of dioxane was added and using Cresol Red and Thymol Blue as indicators, titration was carried out by KOH and from the measured amount ($W_1$) of KOH consumed for neutralization and the amount (the calculated value: $W_0$) of KOH required to neutralize the acetic acid if the acid anhydride loaded at first was all converted to acetic acid without being consumed for the reaction with the polyester resin, the value of KOH by mg was calculated as the difference ($W_0-W_1$) and the calculated value was divided with the value of polyester by g to obtain the hydroxyl value.

(4) Weight Average Molecular Weight of Polyester Resin

The weight average molecular weight was measured by GPC analysis (using a solution transporting unit LC-10ADvp type and UV-visible light spectrometer SPD-6AV model manufactured by Shimadzu Corporation; detection wavelength: 254 nm; solvent: tetrahydrofuran; conversion on the basis of polystyrene).

(5) Glass Transition Temperature of Polyester Resin

Using 10 mg of polyester resin as a sample, measurement was carried out using a DSC (differential scanning calorimetry) apparatus (manufactured by Perkin Elmer Inc., DSC7 model) under the condition of the temperature increase speed of 10° C. /min, the middle value of two curving points derived from the glass transition in the obtained temperature increase curve was measured and the value was defined as the glass transition temperature ($T_g$).

(6) Solid Matter Concentration of the Aqueous Dispersion of Polyester Resin

A proper amount of a polymer dispersion was weighed and the polymer dispersion was heated until the mass of the remaining (the solid matter) became constant at 150° C. and the concentration of the polyester resin solid matter was calculated.

(7) Viscosity of the Aqueous Dispersion of Polyester Resin

Using DVL-BII model digital viscometer (B-type viscometer) manufactured by TOKIMEC INC., the rotation viscosity values ($\eta_{10}$, $\eta_{40}$) of the aqueous dispersion were measured at a temperature of 10° C. and 40° C., respectively.

(8) Content of the Organic Solvent in the Aqueous Dispersion of Polyester Resin

Using gas chromatography GC-8A manufactured by Shimadzu Corporation [using FID detector; the carrier gas: nitrogen; the substance packing columns (produced by G.L. Science Co.,): PEG-HT (5%)-Uniport HP (60/80 mesh); column size: diameter 3 mm×3 mm; the sample loading temperature (the injection temperature): 150° C.; the column temperature: 60° C.; the inner standard substance: n-butanol], the aqueous dispersion or the aqueous dispersion A diluted with water was directly loaded to the apparatus to obtain the content of the organic solvent. The detection limit was 0.01% by mass.

(9) D (ave) of Polyester Resin Particle

Using a transmission electron microscope (JEM200CX) manufactured by JEOL DATUM LTD., optional 50 particle of resin particles were observed by 50,000 times magnification and the value was calculated by dividing the minor axis by the major axis of each resin particle and the average value of the calculated value was defined as D(ave).

(10) Average Particle Size of Polyester Resin Particle

The number average particle size (Mn) obtained using a microtrack particle size distribution measurement apparatus UPA 150 (MODEL No. 9340) manufactured by Nikkiso Co., Ltd. was defined as the average particle size.

(11) Thickness of Resin Coating Film

The thickness of a substrate [in the examples, polyester (PET) film (a thickness of 12 μm, produced by Unitika Ltd.)] was previously measured using the thickness meter (MICROFINE Σ manufactured by Union Tool Co.) and, after the resin coating film was formed on the substrate using the aqueous dispersion, the thickness of the resin coating film-bearing substrate was also measured in the same manner and the difference was defined as the thickness of the resin coating film.

(12) Adhesion Property of Resin Coating Film

To a coating film (the thickness of about 1 μm) formed on a PET film (produced by Unitika Ltd.; the thickness of 12 μm), an adhesive tape (a width of 18 mm) standardized according to JIS Z1522 was stuck while the end part being left and sufficiently rubbed with an eraser to be firmly stuck and then the end part of the adhesive tape was pulled at once after being kept at right angles to the film to peel the tape. The adhesive tape was analyzed by surface infrared spectroscopic apparatus (manufactured by Perkin-Elmer Co., SYSTEM 2000; using Ge60°50×20×2 mm prism) to investigate whether the resin coating film adhered to the adhesive tape or not and the adhesion property of the resin coating film to the PET film was evaluated according to the following standards.

"O": No peak derived from the resin coating film was observed in the adhesive tape face.

"x": Peaks derived from the resin coating film were observed in the adhesive tape face.

(13) Evaluation of Ink Peeling

Lines with a width of about 2 mm and a length of about 10 mm were drawn with an oleaginous marker, Peace (middle letter, a round lead), produced by Mitsubishi Pencil Co., Ltd. on a PET film (produced by Unitika Ltd.; a thickness of 12 μm), and then the lines were rubbed with a brush impregnated with the aqueous dispersion (or the aqueous dispersion A) and the occurrence of the ink peeling was observed by eye observation.

"O": No ink peeling was observed after rubbing 10 times.

"x": Ink peeling was observed after rubbing 10 times.

(14) Ratio of the Decrease of Molecular Weight After Long Time Storage

The weight average molecular weight was measured before and after storage of the aqueous dispersion at 40° C. for 180 days. The resin components were obtained by vacuum-drying the aqueous dispersion at 40° C. for 24 hours and the weight average molecular weight was measured by GPC analysis according to the same method as described in the forgoing description (4). The ratio of the decrease of the molecular weight was calculated by the following equation to utilize the calculated value as an index of a stability of the molecular weight. Those with the low decrease ratio were excellent in the stability.

$$\text{(molecular weight decrease ratio)} = [(M_0 - M_{180})/M_0] \times 100 \ (\%)$$

$M_0$: the initial weight average molecular weight
$M_{180}$: the weight average molecular weight after storage at 40° C. for 180 days.

The polyester resins used in the examples and the comparative examples were produced as follows:

[Polyester resin P-1, P-3, P-4, P-7, P-8]

A mixture of 25.10 kg of terephthalic acid, 10.76 kg of isophthalic acid, 9.38 kg of ethylene glycol, and 13.48 kg of neopentyl glycol was heated in an autoclave at 260° C. for 4 hours to carry out esterification reaction. Then, 1.57 kg of an ethylene glycol solution containing 1% by mass of antimony trioxide was added as a catalyst and the resulting reaction system was heated to 280° C. and the pressure was gradually decreased to reach 13 Pa after 1.5 hours. The polycondensation reaction was further continued under the same conditions, the pressure of the reaction system was adjusted to be a normal pressure with nitrogen gas after 2 hours, and the temperature of the reaction system was decreased and when it reached 270° C., 907 g of trimellitic acid was added and the mixture was stirred at 250° C. for 1 hour to carry out depolymerization. After that, the system was made in pressurizing state with nitrogen gas, and then the resulting resin was discharged in a sheet-like shape. After the resin was sufficiently cooled to a room temperature, it was crushed by a crusher and segments with 1 to 6 mm meshes were sampled using sieves to obtain granular polyester resin P-1.

In the same manner, the acid components and the alcohol components were selected as shown in Table 1, the polyester resin P-3, P-4, P-7, P-8 were obtained.

[Polyester resin P-2, P-5]

A mixture of 24.85 kg of terephthalic acid, 10.65 kg of isophthalic acid, 11.18 kg of ethylene glycol, and 10.16 kg of neopentyl glycol was heated in an autoclave at 260° C. for 4 hours to carry out esterification reaction. Then, 1.56 kg of an ethylene glycol solution containing 1% by mass of antimony trioxide was added as a catalyst and the resulting reaction system was heated to 280° C. and the pressure was gradually decreased to reach 13 Pa after 1.5 hours. The polycondensation reaction was further continued under the same conditions, the pressure of the reaction system was adjusted to be a normal pressure with nitrogen gas after 2 hours, and the temperature of the reaction system was decreased and when it reached 270° C., 988 g of trimellitic acid and 356 g of neopentyl glycol were added and the mixture was stirred at 250° C. for 1 hour to carry out depolymerization. After that, the system was made in pressurizing state with nitrogen gas, and then the resulting resin was discharged in a sheet-like shape. After the resin was sufficiently cooled to a room temperature, it was crushed by a crusher and segments with 1 to 6 mm meshes were sampled using sieves to obtain granular polyester resin P-2.

In the same manner, the acid components and the alcohol components were selected as shown in Table 1, the polyester resin P-5.

[Polyester resin P-6]

A mixture of 35.51 kg of terephthalic acid, 3.32 kg of ethylene glycol, and 21.95 kg of 1,2-propanediol was heated in an autoclave at 240° C. for 4 hours to carry out esterification reaction. Then, 2.91 kg of an ethylene glycol solution containing 1% by mass of tetra-n-butyl titanate was added as a catalyst and the pressure of the resulting reaction system was gradually decreased to reach 13 Pa after 1.5 hours. The polycondensation reaction was further continued under the same conditions, the pressure of the reaction system was adjusted to be a normal pressure with nitrogen gas after 4 hours, and the temperature of the reaction system was decreased and when it reached 230° C., 1392 g of trimellitic acid was added and the mixture was stirred at 230° C. for 2 hours to carry out depolymerization. After that, the system was made in pressurizing state with nitrogen gas, and then the resulting resin was discharged in a sheet-like shape. After the resin was sufficiently cooled to a room temperature, it was crushed by a crusher and segments with 1 to 6 mm meshes were sampled using sieves to obtain granular polyester resin P-6.

TABLE 1

| Polyester resin (named) | | | P-1 | P-2 | P-3 | P-4 | P-5 | P-6 | P-7 | P-8 |
|---|---|---|---|---|---|---|---|---|---|---|
| Depolymerization [a] (mole ratio) | | | TMA (2) | TMA (2.2) NPG (1.6) | IPA (5) | TMA (2) | TMA (2) IPA (1.6) NPG (2) | TMA (3.1) | IPA (3) TMA (2) | IPA (5) TMA (3) |
| Constitution of polyester resin | Acid components [a] (mole ratio) | TPA | 70.7 | 70.0 | 73.5 | 55.9 | 100.0 | 100.0 | 95.0 | 95.0 |
| | | IPA | 29.3 | 30.0 | 31.5 | 30.3 | 1.6 | — | 8.0 | 10.0 |
| | | TMA | 2.0 | 2.2 | — | 2.0 | 2.0 | 3.1 | 2.0 | 3.0 |
| | | ADA | — | — | — | 13.8 | — | — | — | — |
| | | Total | 102.0 | 102.2 | 105.0 | 102.0 | 103.6 | 103.1 | 105.0 | 108.0 |
| | Alcohol components [a] (mole ratio) | EG | 45.0 | 60.5 | 32.4 | 52.0 | 30.5 | 24.8 | 44.3 | 44.3 |
| | | NPG | 55.0 | 41.1 | 37.3 | 48.0 | 71.5 | — | 55.7 | 55.7 |
| | | PG | — | — | — | — | — | 75.2 | — | — |
| | | BAEO | — | — | 30.3 | — | — | — | — | — |
| | | Total | 100 | 101.6 | 100 | 100 | 102 | 100 | 100 | 100 |
| Acid value (mg KOH/g) | | | 14.1 | 16.7 | 17.8 | 14.8 | 21.2 | 21.6 | 30.3 | 48.1 |
| Hydroxyl value (mg KOH/g) | | | 0.5 | 9.7 | 1.2 | 0.8 | 11.2 | 1.0 | 1.0 | 1.0 |
| Weight average molecular weight | | | 29500 | 21000 | 14800 | 28400 | 19000 | 17000 | 9800 | 7100 |
| Glass transition temperature (° C.) | | | 66 | 66 | 72 | 46 | 68 | 85 | 68 | 66 |

[a] TPA: terephthalic acid, IPA: isophthalic acid, TMA: trimellitic acid, ADA: adipic acid, EG: ethylene glycol, NPG: neopentyl glycol, BAEO: 2,2-bis(4-hydroxyethoxyphenyl)propane, PG: 1,2-propanediol Further using the above describe polyester resins, aqueous dispersions A of the polyester resin were obtained by the methods as follows.

[Aqueous dispersions A of the polyester resin E-1 to E-8]

Using a stirring apparatus (manufactured by Tokushu Kika Kogyo Co., Ltd., T.K. Robomics) provided with an internal glass container with a capacity of 2 liter and equipped with a jacket, 300 g of the polyester resin P-1, 180 g of isopropyl alcohol, 9.2 g of triethylamine, and 510.8 g of distilled water were loaded to the glass container and stirred at 7,000 rpm rotation speed of stirring blades (Homo Disper) to find no precipitate of resin granule in the bottom of the container and the resin being in completely floating state. While such a state being kept, hot water was passed through the jacket after 10 minutes to heat the resulting dispersion. Further, the temperature of the system was being kept at 73° C. to 75° C., stirring was carried out for 30 minutes. After that, cold water was passed through the jacket and the rotation speed was decreased to 4,000 rpm to continuously stir the resulting dispersion, it was cooled to a room temperature (about 25° C.) to obtain an aqueous dispersion E-1 of polyester resin with evenly opaque white color.

The similar steps were carried out for the loading compositions as shown in the following Table 2 to obtain E-2 to E-8 as aqueous dispersions A of polyester resin.

Incidentally, Table 2 shows the loading compositions at the time of obtaining the above described aqueous dispersions A of polyester resin and the measured solid matter concentrations for the obtained aqueous dispersions A of polyester resin.

TABLE 2

| Aqueous dispersion A of polyester resin (named) | Loading composition | | | | Solid matter concentration [% by mass] |
|---|---|---|---|---|---|
| | Polyester resin Kinds (named) | Isopropyl alcohol [g] | Triethylamine [g] | Distilled water [g] | |
| E-1 | P-1 | 300 | 180 | 9.2 | 510.8 | 30.3 |
| E-2 | P-2 | 300 | 180 | 10.8 | 509.2 | 30.1 |
| E-3 | P-3 | 300 | 180 | 11.6 | 508.4 | 30.2 |
| E-4 | P-4 | 300 | 180 | 9.6 | 510.4 | 30.4 |
| E-5 | P-5 | 300 | 150 | 13.8 | 536.2 | 30.5 |
| E-6 | P-6 | 300 | 150 | 14.1 | 535.9 | 30.3 |
| E-7 | P-7 | 300 | 150 | 16.4 | 533.6 | 30.0 |
| E-8 | P-8 | 300 | 150 | 26.0 | 524.0 | 30.2 |

Example 1

A two-port type round bottom flask with a capacity of 1 L was loaded with 700 g of E-1 and 189g of distilled water and a mechanical stirrer and a Liebig type condenser were installed and then the flask was heated in an oil bath to distill an aqueous medium. When about 360 g of the aqueous medium was distillation removed, the heating was finished and the remaining was cooled at a room temperature. After the cooling, the liquid component in the flask was filtered with a 600 mesh (twilled and folded textile) filter and the solid component concentration in the filtered liquid was measured to find it 40.8% by mass. While being stirred, the filtered liquid was mixed with distilled water to adjust the solid matter concentration to be 35% by mass to obtain aqueous dispersion of polyester resin S-1 of the present invention. The solid matter concentration after the adjustment was 35.2% by mass.

Observation of the appearance of the aqueous dispersion with eyes made it clear that the aqueous dispersion was even with no precipitate and layer separation. Next, the obtained aqueous dispersion was applied to a biaxially stretched PET film (produced by Unitika Ltd., a thickness of 12 μm) as a substrate by an on-table type coating apparatus (manufactured by Yasuda Seiki Co., Film Applicator No. 542-AB model, Bar Coater apparatus) and then heated in an oven set at 130° C. for 1 minute to form a transparent resin coating film with a thickness of 1 μm on the PET film.

Further, other characteristic values were as follows:

viscosity: $\eta_{10}$=7 mPa·s, $\eta_{40}$=4 mPa·s the content of the aqueous organic solvent: 0.05% by mass D(ave): 0.95 the average particle size: 90 nm the adhesion property of the resin coating film: O the ink peeling evaluation: O the molecular weight decrease ratio after long time storage: 0.9%

Examples 2 to 7

Using E-2 to E-7, aqueous dispersions S-2 to S-7 were obtained in the same manner as example 1. Observation of these aqueous dispersions with eyes made it clear that they were even with no precipitate and layer separation.

Then, using these aqueous dispersions, resin coating films with a thickness of 1 μm were formed on the PET film by the same steps as those of the example 1.

Other characteristic properties were shown in Table 3.

Example 8

While 100 g of S-1 being stirred by a magnetic stirrer, 8 g of an isobutanol solution of melamine resin (Cymel 325, produced by Mistui-Cytech Co., Ltd., 80% by mass of non-volatile components) was added to obtain an aqueous coating composition of the present invention. Then, the obtained aqueous coating composition was applied to a commercialized tin-free steel (TFS, a thickness of 0.2 mm) by using an on-table type coating apparatus (manufactured by Yasuda SeiKi Co., Film Applicator No. 542-AB model, Bar Coater apparatus) and then heated in an oven set at 200° C. for 3 minutes to form a transparent resin coating film with the thickness of 1 μm on the TFS.

The resin coating film obtained in such a manner is rubbed by gauze impregnated with methyl ethyl ketone (MEK) and then dried at a room temperature. The observation of the appearance of the resin coating film with eyes made it clear that the resin coating film was not at all changed and had an excellent solvent resistance.

Further, the same evaluation as described above was carried out solely for S-1, the resin coating film was changed to be white.

Example 9

The aqueous dispersion S-1 immediately after production and S-1 after 180-day storage were respectively applied to a biaxially extruded PET film (produced by Unitika Ltd., a thickness of 12 μm) as a substrate by an on-table type coating apparatus (manufactured by Yasuda SeiKi Co., Film Applicator No. 542-AB model, Bar Coater apparatus) and then heated in an oven set at 130° C. for 1 minute to form transparent resin coating films with a thickness of 1 μm on the PET film.

Next, both of the resin coating films were immersed in hot water at 60° C. for 30 minutes, and after they were dried at a room temperature, the appearance of the films was observed with eyes to find both resin coating films were neither dissolved nor made white, proving an excellent water proofness.

Further, after both resin coating films were rubbed by gauze impregnated with isopropanol and then dried at a room temperature, the appearance of the resin coating films was observed with eyes to find that the resin coating films were not at all changed and had an excellent solvent resistance.

Comparative Example 1

Using E-1 of the aqueous dispersions A, the same evaluation as that for the aqueous dispersions of the present invention was carried out. Evaluation for the ink peeling was carried out to find the occurrence of the ink peeling after rubbing 10 times and the evaluation result was x.

Table 3 shows other characteristic properties.

Comparative Example 2

Using E-8, an aqueous dispersion S-8 was obtained in the same manner as example 1. Observation of the appearance of the aqueous dispersion made it clear that the aqueous dispersion was even with no precipitate and layer separation. The adhesion property of the resin coating film was evaluated and peaks derived from the resin coating film were observed on the adhesive tape face.

Table 3 shows other characteristic properties.

TABLE 3

|  | Examples | | | | | | | Comparative examples | |
| --- | --- | --- | --- | --- | --- | --- | --- | --- | --- |
|  | 1 | 2 | 3 | 4 | 5 | 6 | 7 | 1 | 2 |
| Aqueous dispersion | S-1 | S-2 | S-3 | S-4 | S-5 | S-6 | S-7 | E-1 *) | S-8 |
| Aqueous dispersion A used for producing the above aqueous dispersion | E-1 | E-2 | E-3 | E-4 | E-5 | E-6 | E-7 | — | E-8 |
| Solid matter concentration (% by mass) | 35.2 | 35.3 | 35.1 | 35.2 | 34.8 | 34.9 | 35.3 | 30.3 | 35.3 |

TABLE 3-continued

|  |  | \multicolumn{7}{c}{Examples} | \multicolumn{2}{c}{Comparative examples} |
| --- | --- | --- | --- | --- | --- | --- | --- | --- | --- | --- |
|  |  | 1 | 2 | 3 | 4 | 5 | 6 | 7 | 1 | 2 |
| Viscosity (mPa · s) | $\eta_{10}$ | 7 | 8 | 8 | 7 | 9 | 10 | 8 | 83 | 10 |
|  | $\eta_{40}$ | 4 | 4 | 5 | 4 | 5 | 5 | 4 | 22 | 4 |
|  | $\eta_{40}/\eta_{10}$ | 0.57 | 0.50 | 0.63 | 0.57 | 0.56 | 0.50 | 0.50 | 0.27 | 0.40 |
| Content of organic solvent (% by mass) |  | 0.05 | 0.06 | 0.04 | 0.05 | 0.04 | 0.05 | 0.06 | 17.8 | 0.06 |
| D(ave) |  | 0.95 | 0.94 | 0.93 | 0.94 | 0.95 | 0.93 | 0.95 | Impossible to measure | 0.93 |
| Average particle size (nm) |  | 90 | 85 | 103 | 92 | 110 | 73 | 52 | 92 | 70 |
| Adhesion property of resin coating film |  | ○ | ○ | ○ | ○ | ○ | ○ | ○ | ○ | X |
| Evaluation of ink peeling |  | ○ | ○ | ○ | ○ | ○ | ○ | ○ | X | ○ |
| Decrease ratio of molecular weight after long time storage (%) |  | 0.9 | 1.2 | 0.5 | 2.1 | 0.6 | 0.5 | 1.8 | 4.3 | 2.0 |

*) Aqueous dispersion A

According to the above described examples and comparative examples, it was found that since the aqueous dispersion of the present invention contained an organic solvent in a low concentration, the molecular stability was improved. Further, it was shown that since the content of the organic solvent was decreased in the aqueous dispersion of the present invention, no ink bleeding and ink peeling took place even if the coating was formed on an ink layer with inferior solvent resistance. Furthermore, since the viscosity fluctuation depending on the ambient temperature was small, the workability was also excellent. Further, excellent long time storage-stability was provided.

Effects of the Invention

Since the aqueous dispersion of polyester resin of the present invention is excellent in a molecular weight stability, even if the aqueous dispersion of the present invention is stored for a long time, a coating film obtained from the aqueous dispersion can be provided with excellent processibilities (workabilities), water proofness, and solvent resistances.

Further, since the amount of the organic solvent in the aqueous dispersion of polyester resin of the present invention is effectively decreased, the aqueous dispersion is excellent from a viewpoint of environmental preservation and improvement of industrial hygiene and even if the aqueous dispersion is applied to form a coating on a substrate with an inferior solvent resistance or on an ink layer with an inferior solvent resistance, the substrate surface is not damaged or ink bleeding or ink peeling does not take place.

Further, it is possible to form a polyester resin coating film being excellent in a hot water resistance, solvent resistances, and processibilities using the aqueous dispersion of the present invention, so that the aqueous dispersion of the present invention is suitable for a binder component of a coating material and of a variety of coating agents and is capable of improving the properties of an anchor coat of a variety of films, the inner or outer face coating of cans, a coating material for steel plates, a precoated metal coating material, an adhesive, a surface treatment agent, an ink, a fiber treatment agent, a paper coating agent and the like in the use for them.

Further, since the content of the organic solvent is low, the aqueous dispersion of the present invention can preferably be used for a wider range of substrates in the above described use purposes.

What is claimed is:

1. An aqueous dispersion of polyester resin having an acid value of 8 to 40 mg KOH/g and a weight average molecular weight of 9,000 or more, wherein the aqueous dispersion contains an organic solvent less than 0.5% by mass;

the polyester is formed of dicarboxylic acid as a dicarboxylic acid component among constitutional acid components; wherein said dicarboxylic acid is at least one dicarboxylic acid selected from the group consisting of terephthalic acid, isophthalic acid, orthopthalic acid, naphthalenedicarboxylic acid, biphenyldicarboxylic acid, oxalic acid, succinic acid, succinic anhydride, adipic acid, azelaic acid, sebasic acid, dodecanedioic acid, hydrogenated dimer acid, fumaric acid, maleic acid, maleic anhydride, itaconic acid, itaconic anhydride, citraconic acid, citraconic anhydride, dimer acid, 1,4-cyclohexanedicarboxylic acid, 1,3-cyclohexanedicarboxylic acid, 1,2-cyclohexanedicarboxylic acid, 2,5-norbornenedicarboxylic acid, an anhydride of 2,5-norbornenedicarboxylic acid, tetrahydrophthalic acid and an anhydride of tetrahydrophthalic acid;

the polyester contains aromatic polybasic acids as a constituent acid component at a ratio of 70% by mole or higher; and the polyester may contain as the constituent acid component a tri- or more carboxylic acid and/or a monocarboxylic acid.

2. The aqueous dispersion of polyester resin according to either claim 1, wherein the polyester resin contains mainly neopentyl glycol and ethylene glycol as constituent alcohol components.

3. The aqueous dispersion of polyester resin according to either claim 1, wherein the polyester resin contains mainly 1,2-propanediol and ethylene glycol as constituent alcohol components.

4. A method for producing the aqueous dispersion of polyester resin according to claim 1 comprising a first a step of obtaining an aqueous dispersion of polyester resin containing not lower than 0.5% by mass of an organic solvent by adding the polyester resin and a basic compound to an aqueous medium to make the resulting mixture aqueous and then a step of removing the organic solvent from the aqueous dispersion.

5. A method for producing the aqueous dispersion of polyester resin according to claim 2 comprising at first a step of obtaining an aqueous dispersion of polyester resin containing not lower than 0.5% by mass of an organic solvent by adding the polyester resin and a basic compound to an aqueous medium to make the resulting mixture aqueous and then a step of removing the organic solvent from the aqueous dispersion.

6. A method for producing the aqueous dispersion of polyester resin according to claim 3 comprising at first a step of obtaining an aqueous dispersion of polyester resin containing not lower than 0.5% by mass of an organic solvent by adding the polyester resin and a basic compound to an aqueous medium to make the resulting mixture aqueous and then a step of removing the organic solvent from the aqueous dispersion.

7. An aqueous coating composition being obtained by adding a curing agent to the aqueous dispersion of polyester resin according to claim 1.

8. An aqueous coating composition being obtained by adding a curing agent to the aqueous dispersion of polyester resin according to claim 2.

9. An aqueous coating composition being obtained by adding a curing agent to the aqueous dispersion of polyester resin according to claim 3.

10. The aqueous dispersion of polyester resin of claim 1, wherein said weight average molecular weight is 14,000 or more.

11. The aqueous dispersion of polyester resin of claim 1, wherein said acid value is 8 to 25 mg KOH/g.

12. The aqueous dispersion of polyester resin of claim 1, wherein the glass transition temperature of said polyester resin is 0° C. to 100° C.

13. The aqueous dispersion of polyester resin of claim 1, wherein said aqueous dispersion further comprises a compound having a protective colloidal function.

14. The aqueous dispersion of polyester resin of claim 1, wherein said aqueous dispersion further comprises an ingredient selected from the group consisting of leveling agent, defoaming agent, bubbling preventing agent, pigment dispersing agent, UV absorbing agent, pigment and dye.

* * * * *